United States Patent [19]

Ito

[11] Patent Number: 5,479,905
[45] Date of Patent: Jan. 2, 1996

[54] FUEL VAPOR CONTROL SYSTEM AND THE METHOD THEREOF

[75] Inventor: Takenori Ito, Kawasaki, Japan

[73] Assignee: Fuji Jukogyo Kabushiki Kaisha, Tokyo, Japan

[21] Appl. No.: 371,368

[22] Filed: Jan. 11, 1995

[30] Foreign Application Priority Data

Jan. 31, 1994 [JP] Japan .................................. 6-009518

[51] Int. Cl.$^6$ .................................................. F02M 37/04
[52] U.S. Cl. ................................. 123/520; 123/198 D
[58] Field of Search .................................. 123/520, 521, 123/518, 519, 516, 198 D

[56] References Cited

U.S. PATENT DOCUMENTS

| | | | |
|---|---|---|---|
| 5,027,780 | 7/1941 | Uranishi | 123/520 |
| 5,067,468 | 11/1991 | Otowa | 123/520 |
| 5,220,898 | 6/1993 | Kidokoro | 123/520 |
| 5,235,955 | 8/1993 | Osaki | 123/520 |
| 5,277,168 | 1/1994 | Kondo | 123/519 |
| 5,373,823 | 12/1994 | Kuroda | 123/520 |
| 5,381,069 | 1/1995 | Harris | 123/519 |
| 5,388,611 | 2/1995 | Harris | 123/519 |

*Primary Examiner*—Carl S. Miller
*Attorney, Agent, or Firm*—Beveridge, DeGrandi, Weilacher & Young

[57] ABSTRACT

A fail-safe system and method for automobile fuel tank wherein when the fuel filler cap is opened at fueling and the pressure in the fuel tank goes down to an atmospheric pressure level, the pressure sensor detects the pressure down and the pressure control valve provided between the fuel tank and the canister is automatically closed for a specified time. Therefore, even if a vehicle driver inadvertently forgets to switch the ignition key off at fueling, fuel does not flow out of the canister when the fuel tank is filled up. The system does not need any additional device.

5 Claims, 4 Drawing Sheets

FUEL VAPOR CONTROL SYSTEM AND THE METHOD THEREOF

BACKGROUND OF THE INVENTION

1. Technical Field

The present invention relates to a fuel vapor control system and the method thereof for automobile fuel tank and more specifically to an opening and closing control system and the method of a fuel passage communicating an upper space of a fuel tank and a canister.

2. Related Prior Arts

Commonly, in an automobile there is provided with a pressure control valve (PCV) in a fuel vapor passage which communicates an upper space of a fuel tank to a canister. The pressure control valve is opened or closed by the control of an electronic control unit. The control valve is controlled such that while the engine is in operation the fuel vapor passage is opened so as to prevent an increase of pressure within the fuel tank and while the engine is stopped the fuel vapor passage is closed so as to prevent an outflow of fuel vapor into atmospheric air.

That is to say, in the prior art when the pressure becomes higher than a specified value during engine operation the pressure control valve opens the fuel vapor passage and the fuel vapor filled in the upper space of the fuel tank is adsorbed into the canister through the fuel passage. When the engine is stopped for fueling, the pressure control valve closes the vapor passage and the fuel vapor is blocked to flow out of the vehicle through the canister. Accordingly, then an automatic stop of the fuel nozzle is operated to stop fueling.

However, in the abovementioned prior art, in case where the engine is inadvertently not stopped on fueling, the pressure control valve is opened when the pressure in the upper space of the fuel tank reaches a specified value. At this time the automatic stop of the fuel nozzle is not operated to stop fueling automatically. As a result, fuel is filled up in the fuel tank and eventually excessive fuel flows outside from the canister through the fuel vapor passage.

In order to prevent this, as disclosed in Japanese Patent Application Laid Open Nos. Jitsu-Kai-Hei 5-6144, Jitsu-Kai-Hei 5-6455 and Toku-Kai-Hei 5-10215, there is such a technique that the pressure control valve is closed when a fueling sensor, a fueling switch and the like detect an insertion of a fuel nozzle.

However, this technique needs an additional fueling sensor or switch to be installed on the vehicle and consequently the system becomes complicated.

SUMMARY OF THE INVENTION

It is an object of the present invention to provide a fuel vapor control system for fuel tank which can prevent fuel from flowing out of the canister without using an additional sensor or switch on fueling when a vehicle driver forgets to turn off the ignition switch and fuel is filled up in the fuel tank during fueling.

Further, it is another object of the present invention to provide a fuel vapor control system which can secure an operation of the automatic stop of the fuel nozzle on fueling.

Disclosed is a fuel vapor control system for fuel tank comprising:

fueling judgement means for judging whether or not the vehicle is fueled based on the pressure detected by the pressure sensor provided in the upper space of the fuel tank and the vehicle speed detected by the vehicle speed sensor when the engine is operated;

closing signal generating means for generating a closing signal for a predetermined time when it is judged that the vehicle is fueled; and pressure control valve closing means responsive to the closing signal for closing the pressure control valve provided in the fuel vapor passage between the fuel tank and the canister so as to prevent fuel from flowing out of the canister through the fuel vapor passage during fueling.

In the fuel vapor control system thus constituted, under the normal operating condition of vehicle, when fuel is vaporized and the pressure at the upper space of the fuel tank becomes higher than a predetermined value, the electronic control unit opens the pressure control valve so as to communicate the fuel vapor passage between the upper space of the fuel tank and the canister. Therefore, under this condition, fuel vapor filled in the upper space of the fuel tank flows into the canister through the fuel vapor passage and is adsorbed therein.

On the other hand, when the engine is stopped, the electronic control unit closes the pressure control valve to shut off the communication between the upper space of the fuel tank and the canister. In this condition fuel vapor in the fuel tank does not flow out into atmospheric air. Also at the fueling during engine stop, fuel vapor does not flow out of the vehicle and the automatic stop of the fuel nozzle is operated to stop fueling.

On the other hand, at the fueling during engine operation, the pressure within the upper space of the fuel tank goes down to an atmospheric pressure level as soon as the fuel filler cap is opened and based on the signals from the vehicle speed sensor and the pressure sensor the electronic control unit closes the pressure control valve from that instance until a predetermined time needed for fueling to shut off the communication between the upper space of the fuel tank and the canister. Consequently, even at the fueling in an engine operating state fuel does not flow out of the canister through the fuel vapor passage and the automatic stop of the fuel nozzle is operated to stop fueling.

DETAILED DESCRIPTION OF PREFERRED EMBODIMENTS

Figure 1:
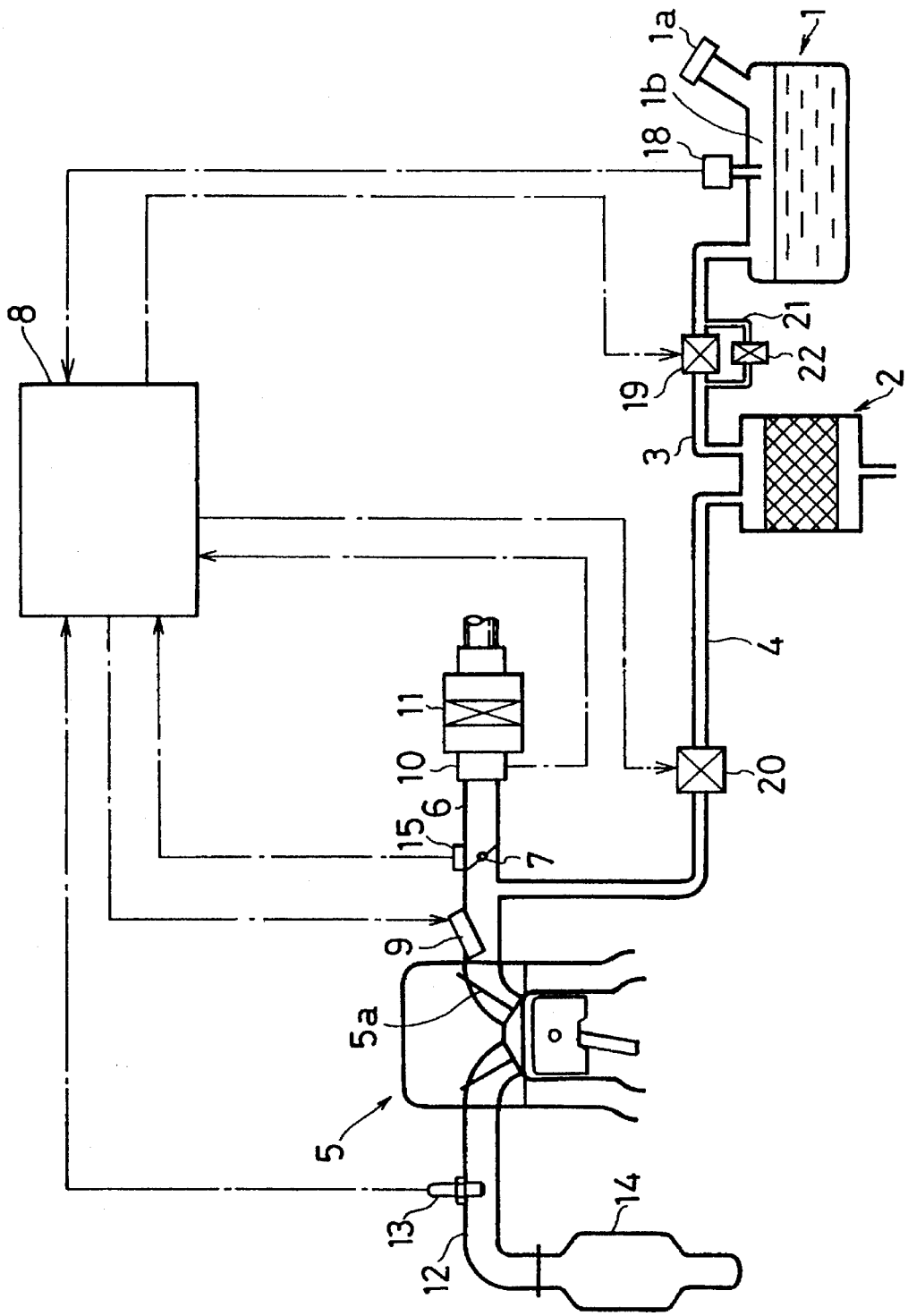
FIG. 1 is a schematic diagram showing an embodiment according to the present invention.

Referring now to FIG. 1, numeral 1 denotes a fuel tank having a fuel filler cap 1a, and numeral 2 a canister communicated to an upper space 1b in the fuel tank 1 through a fuel vapor passage 3. The canister 2 is also communicated with a downstream portion of a throttle valve 7 in an intake manifold 6 of an engine 5 through a purge passage 4.

The engine 5 is an electronically controlled engine in which a fuel injection amount and a fuel injection timing are controlled by an electronic control unit 8, fuel is injected into an intake port 5a and a fuel injector 9 is equipped downstream of the intake manifold 6. Upstream of the throttle valve 7 of the intake manifold 6 an air flow meter and an air cleaner 11 are disposed in this order. Further, in an exhaust manifold 12 an $O_2$ sensor 13, a catalytic converter 14 are disposed respectively. The fuel injector 9 is communicated with the fuel tank 1 through a fuel supply passage (not shown).

Figure 2:
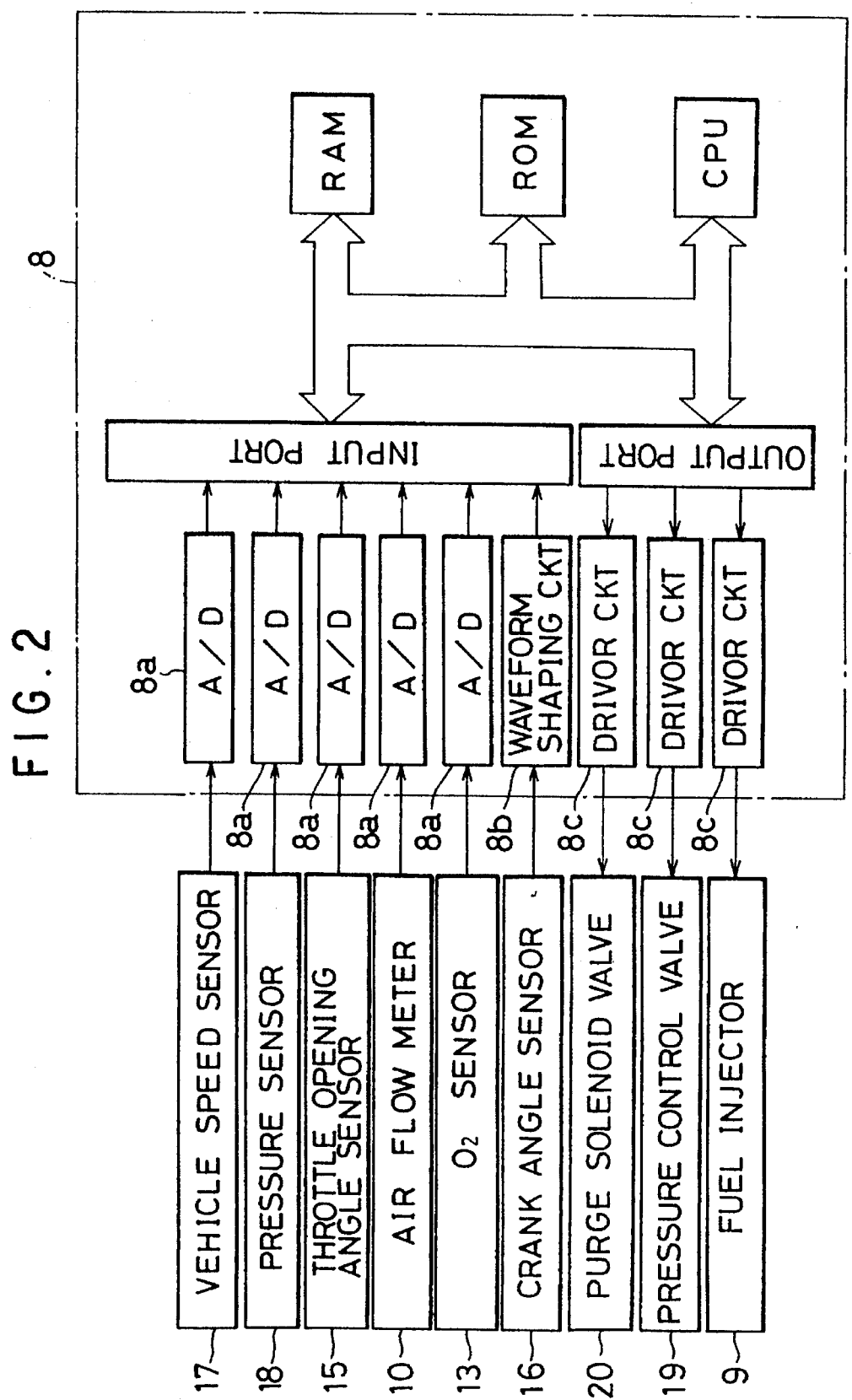
FIG. 2 is a block diagram showing an input/output construction of an embodiment according to the present invention.

The electronic control unit 8 is a micro-computer comprising a CPU, a ROM, a RAM, and an input port connected with each other through a bus line, as shown in FIG. 2. Further, a plurality of A/D converters 8a and a waveform shaping circuit 8b are connected to the input port and a plurality of driver circuits 8c are connected to the output port. A throttle opening angle signal from a throttle opening angle sensor 15 provided in the throttle valve 7 for detecting a throttle angle, an intake air amount signal from the air flow meter 10, an air-fuel ratio signal from the $O_2$ sensor 13 are inputted through A/D converters 8a respectively. Further, a crank angle signal from a crank angle sensor 16 is inputted through the waveform shaping circuit 8b. Further, a fuel injection amount signal and a fuel injection timing signal are respectively outputted to the fuel injector 9 through the driver circuits 8c connected to the output port.

Further, a vehicle speed signal from a vehicle speed sensor 17 for detecting a vehicle speed V based on a wheel speed, a rotational speed of the output shaft of the transmission or the Like and a pressure signal from a pressure sensor 18 provided in the upper space of the fuel tank 1 for detecting a pressure P thereof are inputted to the input port of the ECU 8 through the A/D converters 8a respectively. Further, a pressure control valve (PCV) 19 and a purge solenoid valve 20 which are subjected to an opening/closing control through the driver circuits 8c connected to the output port are provided.

The pressure control valve 19 is provided in the fuel vapor passage 3 to open and close the fuel vapor passage and the purge solenoid valve 20 is provided in the purge passage 4 to open and close the purge passage. Further, a bypass passage 21 for bypassing the pressure control valve 19 is provided and a mechanical type two-way valve 22 which is opened to the both side according to the pressure difference is provided. The two-way valve 22 acts as a relief valve which is opened only when the pressure inside of the fuel tank 1 becomes excessively high or low in order to prevent the fuel tank 1 from being damaged.

Figure 3:
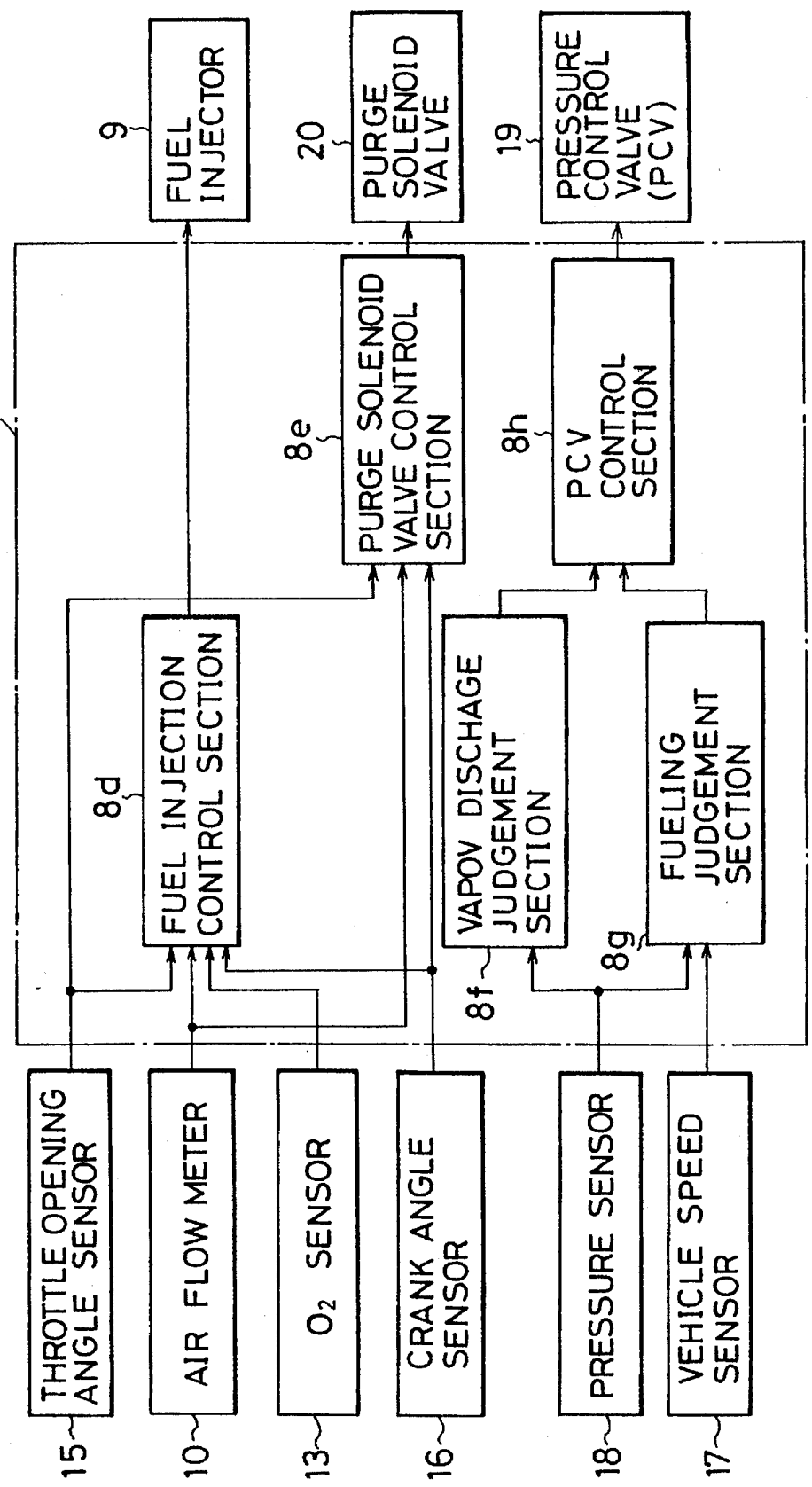
FIG. 3 is a block diagram showing a function of an electronic control unit of an embodiment according to the present invention.

Referring to FIG. 3, in the electronic control unit 8 a fuel injection control section 8d is provided. The fuel injection control section 8d outputs a fuel injection amount control signal and a fuel injection timing control signal to the injector 9 through the driver circuits 8c based upon the intake air amount signal inputted through the A/D converter 8a from the air flow meter 10, the throttle opening angle signal inputted through the A/D converter 8a from the throttle opening angle sensor 15, the air-fuel ratio signal inputted through the A/D converter 8a from the $O_2$ sensor 13 and the crank angle signal inputted through the A/D converter 8a from the crank angle sensor 16.

Further, in the electronic control unit 8 a purge solenoid valve control section 8e is provided. The purge solenoid valve control section 8e outputs a valve opening signal to the purge solenoid valve 20 through the driver circuit 8c when the engine 5 is operated at other operational ranges than deceleration and idling and a valve closing signal to the purge solenoid valve 20 through the driver circuit 8c when the engine 5 is operated at a deceleration or an idling range. That is to say, by means of the purge solenoid valve control section 8e, the purge solenoid valve 20 opens the purge passage 4 only when the engine is operated except at deceleration and idling.

Next, the characteristic portions of the present invention, a vapor discharge judgement section 8f, a fueling judgement section 8g and a PCV control section 8h will be described.

The vapor discharge judgement section 8f outputs a vapor discharge signal, in case where the engine is operated and in case where it is judged that the pressure P in the upper space of the fuel tank exceeds a predetermined value $P_1$ based on a pressure signal from a pressure sensor 18. In other cases than mentioned above the vapor discharge judgement section 8f stops outputting the vapor discharge signal.

In case where it is judged that the vehicle is in standstill based on a vehicle speed signal from a vehicle speed sensor 17 and in case where it is judged that the pressure P in the upper space of the fuel tank is approximately equal to the atmospheric pressure $P_O$ based on the pressure signal from the pressure sensor 18, the fueling judgement section 8g outputs a fueling signal from the instance of above judgement until a predetermined time $T_1$ needed for fueling. In other cases than mentioned above the fueling judgement section 8g stops outputting the fueling signal.

The PCV control section 8h outputs a closing signal for closing the pressure control valve (PCV) 19 to the pressure control valve 19 through the driver circuit 8c based on the above fueling signal and the above vapor discharge signal. Further, the PCV control section 8h outputs an opening signal for opening the pressure control valve 19 to the pressure control valve 19 through the driver circuit 8c only when the vapor discharge signal is inputted from the vapor discharge judgement section 8f. When the vapor discharge signal is not inputted, the closing signal is outputted to the pressure control valve 19 through the driver circuit 8c.

Next, the function of the fuel vapor control system according to the embodiment thus constituted will be explained.

While the engine 5 is operated, the vehicle speed signal from the vehicle speed sensor 17 and the pressure signal from the pressure sensor 18 are inputted to the electronic control unit 8. The fueling judgement section 8g judges whether or not the vehicle is in standstill based on the inputted vehicle speed signal. Further, the fueling judgement section 8g judges whether or not the pressure P in the upper space 1b of the fuel tank 1 is approximately equal to the atmospheric pressure $P_O$ based on the inputted pressure signal and the vapor discharge judgement section 8f judges whether or not the pressure P in the upper space 1b of the fuel tank 1 exceeds the predetermined value $P_1$.

Figure 4:
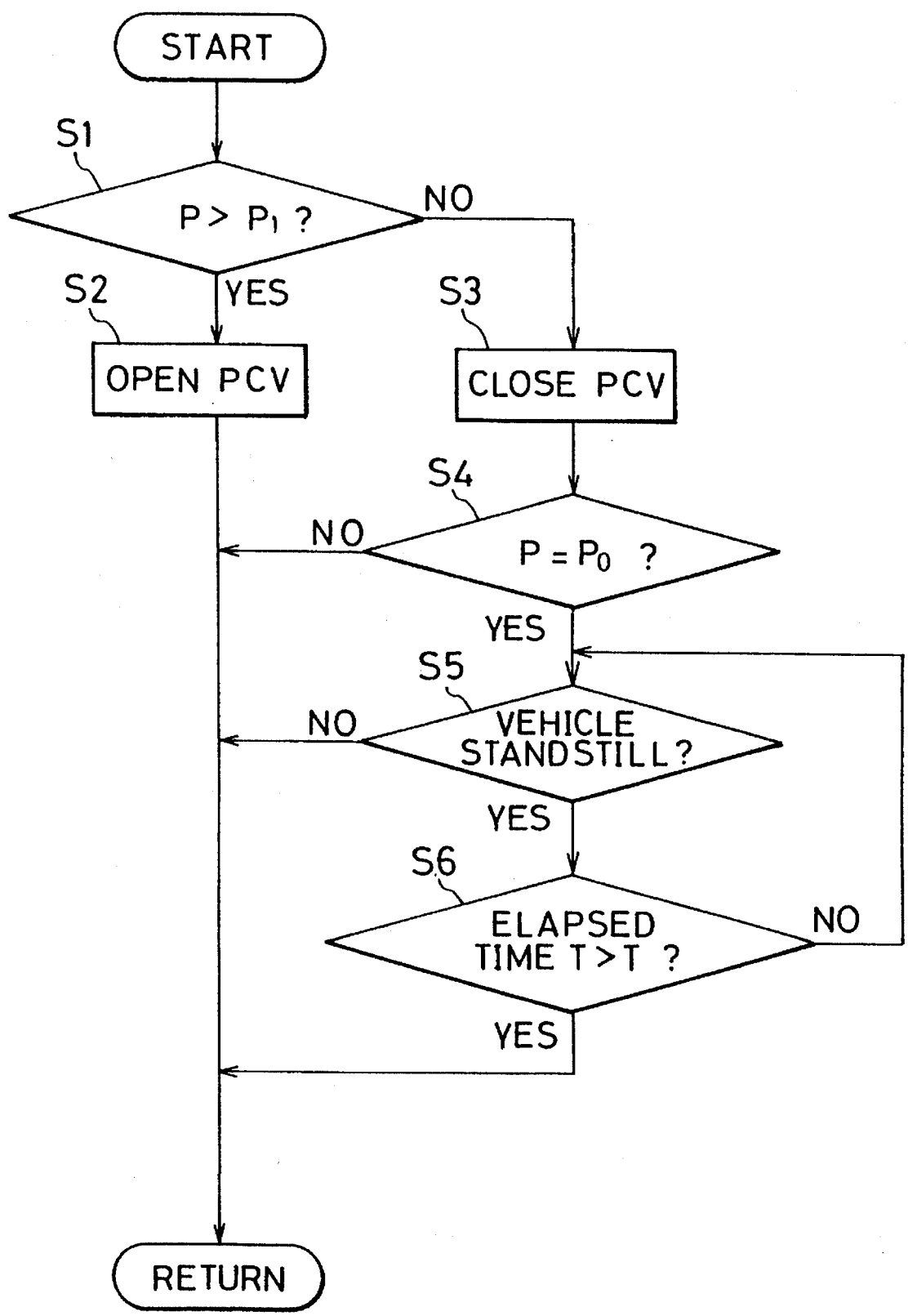
FIG. 4 is a flow chart showing a function of an embodiment according to the present invention.

Referring now to FIG. 4, first at a step S1 it is judged whether or not the engine 5 is operated and the pressure P in the upper space 1b of the fuel tank 1 exceeds the predetermined value $P_1$. If the upper space 1b of the fuel tank 1 is filled up with fuel vapor, namely the pressure P exceeds the predetermined value $P_1$, the judgement at the step S1 is YES and the process goes to a step S2.

At the step S2, the vapor discharge judgement section 8f outputs the vapor discharge signal to the PCV control section 8h and in response to this vapor discharge signal the PCV control section 8h outputs an opening signal to the pressure control valve (PCV) 19 to open the fuel vapor passage 3.

Thus, when the engine 5 is operated and the upper space 1b of the fuel tank 1 is filled up with fuel vapor with the inside pressure P exceeding the predetermined value $P_1$, the fuel vapor passage 3 is automatically opened to communicate the upper space 1b of the fuel tank 1 with the canister 2. Then, fuel vapor filled in the upper space 1b of the fuel tank 1 flows into the canister 2 through the fuel vapor passage 3 and is adsorbed therein. As a result of this, the pressure P within the upper space 1b is kept below the predetermined value P1. The fuel vapor adsorbed by the canister 2 is sucked into the intake manifold 6 through the purge passage 4 by opening the purge solenoid valve 20 when the engine 5 is operated at the operational area except idling and deceleration.

If the judgement is NO at the step S1 and the engine 5 is operated, the process goes to a step S3 where the vapor discharge judgement section 8f stops outputting the vapor discharge signal. Then, the PCV control section 8h outputs a closing signal for closing the pressure control valve 19 to the pressure control valve 19 through the driver circuit 8c to shut off the fuel vapor passage 3.

At a step S4, the fueling judgement section 8g judges whether or not the pressure P in the upper space 1b of the fuel tank 1 is approximately equal to the atmospheric pressure $P_O$ in order to judge whether or not the fuel filler cap 1a is opened. When the fuel filler cap 1a of the fuel tank 1 is opened, since the pressure P in the upper space 1b of the fuel tank 1 becomes approximately the atmospheric pressure $P_O$, the judgement at the step S4 YES and the process goes to a step S5 with the pressure control valve 19 being closed.

At the step S5, it is confirmed whether or not the vehicle is in standstill based on vehicle speed signal from the vehicle speed sensor 17. If it is confirmed that the vehicle is in standstill, the process goes to a step S6 where the fueling judgement section 8g continues to output a fueling signal for closing the pressure control valve 19 until the predetermined time T1 needed for fueling elapses.

As described above, even when the fuel filler cap 1a is opened for fueling with the engine 5 being operated, since the fuel vapor passage is automatically shut off until the predetermined time $T_1$ needed for fueling elapses, fuel does not flow into the canister through the fuel vapor passage 3 even after the fuel tank is filled up with fuel. Also the automatic stop of the fuel nozzle is operated normally.

At a normal fueling with the engine stopped, since the pressure control valve 19 is always closed, fueling is performed in the same manner as an ordinal fuel system without causing an outflow of fuel into the canister 2. The automatic stop of the fuel nozzle is normally operated.

In summary, according to the present invention, when the fuel filler cap is opened for fueling and the pressure in the fuel tank goes down to an atmospheric pressure level, the pressure sensor detects the pressure down and the pressure control valve provided between the fuel tank and the canister is automatically closed for a specified time. Therefore, even if a vehicle driver inadvertently forgets to switch the ignition key off, fuel does not flow out from the canister when the fuel tank is filled up. The system according to the present invention does not need such a particular device as a fuel switch or a fuel sensor used in prior arts.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fuel vapor control system for a fuel tank of a vehicle having an engine, said fuel tank for storing a fuel, canister for storing a fuel vapor, a fuel vapor passage communicating said fuel tank with said canister, a pressure control valve provided in said fuel vapor passage, a pressure sensor for detecting a pressure in an upper space of said fuel tank, an electronic control unit, said pressure control valve for opening said fuel vapor passage by said electronic control unit when said pressure is above a specified value and for closing said fuel vapor passage by said electronic control unit when an engine is stopped, and a vehicle speed sensor for detecting a vehicle speed of said vehicle, comprising:

fueling judgement means for judging whether or not said vehicle is fueled based on said detected pressure and said detected vehicle speed when said engine is operated;

closing signal generating means for generating a closing signal for a predetermined time when it is judged that said vehicle is fueled; and pressure control valve closing means responsive to said closing signal for closing said pressure control valve so as to prevent said fuel from flowing out of said canister through said fuel vapor passage during fueling.

2. The system according to claim 1, wherein said detected pressure is approximately equal to an atmospheric pressure.

3. The system according to claim 1, wherein said detected vehicle speed is equal to zero.

4. The system according to claim 1, wherein said predetermined time starts when it is judged that said vehicle is fueled.

5. A fuel vapor control method for a fuel tank of a vehicle having an engine, said fuel tank for storing a fuel, a canister for storing a fuel vapor, a fuel vapor passage communicating said fuel tank with said canister, a pressure control valve provided in said fuel vapor passage, a pressure sensor for detecting a pressure in an upper space of said fuel tank, an electronic control unit for controlling said engine, said pressure control valve for opening said fuel vapor passage by said electronic control unit when said pressure is above a specified value and for closing said fuel vapor passage by said electronic control unit when said engine is stopped, and a vehicle speed sensor for detecting a vehicle speed of said vehicle, the method comprising the steps of:

judging whether or not said vehicle is fueled based on said detected pressure and said detected vehicle speed when said engine is operated;

generating a closing signal for a predetermined time when it is judged that said vehicle is fueled; and closing said pressure control valve based on said closing signal so as to prevent said fuel from flowing out of said canister through said fuel vapor passage during fueling.

* * * * *